(12) United States Patent
Phillips et al.

(10) Patent No.: US 6,580,725 B1
(45) Date of Patent: Jun. 17, 2003

(54) METHOD AND APPARATUS FOR DYNAMIC ALLOCATION OF A MESSAGING SYSTEM RESOURCE

(75) Inventors: W Garland Phillips, Arlington, TX (US); Jheroen Pieter Dorenbosch, Paradise, TX (US); Jack Anthony Gipson, Fort Worth, TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/107,763

(22) Filed: Jun. 30, 1998

(51) Int. Cl.[7] .............................. H04L 12/43; H04J 3/17; H04J 3/06
(52) U.S. Cl. ..................... 370/461; 370/468; 370/503
(58) Field of Search ................................. 370/329, 345, 370/336, 337, 347, 468, 328, 338, 461, 462, 503; 455/450, 453, 452, 561

(56) References Cited

U.S. PATENT DOCUMENTS

| | | | | |
|---|---|---|---|---|
| 5,384,777 A | * | 1/1995 | Ahmadi et al. ............. | 370/85.2 |
| 6,016,311 A | * | 1/2000 | Gilbert et al. .............. | 370/280 |
| 6,130,886 A | * | 10/2000 | Ketseoglou et al. ........ | 370/347 |
| 6,144,652 A | * | 11/2000 | Avidor et al. ............... | 370/336 |

* cited by examiner

Primary Examiner—Seema S. Rao
Assistant Examiner—Ronald Abelson
(74) Attorney, Agent, or Firm—Roland K. Bowler, II; Matthew C. Loppnow

(57) ABSTRACT

A method and corresponding apparatus for a first controller (106) and implemented in a second controller (110), arranged for providing messaging service to, respectively, a first load (203) and a second load (205), to cooperatively and dynamically allocate a resource (207) between these loads. The method allocates a first and second default portions (221, 231) of the resource (207), and schedules messages from the first and the second load (203, 205) within these default portions (221, 231). Any unused part (243) of the default portions is reported to the other controller and it schedules messages from its load within the unused part (241), thereby dynamically allocating the resource (207) between the first and second load (203, 205).

19 Claims, 7 Drawing Sheets

METHOD AND APPARATUS FOR DYNAMIC ALLOCATION OF A MESSAGING SYSTEM RESOURCE

FIELD OF THE INVENTION

This invention relates generally to communication systems and more specifically to a method and corresponding apparatus of dynamic allocation of a system resource.

BACKGROUND OF THE INVENTION

Messaging systems, and specifically controllers within messaging and paging subscriber systems, typically schedule and transmit messages with minimal system latency. As wireless messaging has evolved, one solution that has been utilized to meet the demand of an expanding wireless marketplace is the concept of resource or more specifically time sharing. Time sharing allows for the static allocation (such as 50-50 or 70-30) of system resources, such as one or more radio frequency channels, between otherwise unrelated messaging systems. The dynamics of day-to-day loading variations between these messaging systems potentially render this static allocation of system resources sub-optimum. Moreover any change in this static allocation requires human intervention to re-allocate system resources between the messaging systems.

Furthermore system latencies can be driven to unnecessarily unacceptable levels for the heavily loaded messaging system if the static allocation becomes outdated. At the same time, if one of the messaging systems is lightly loaded, channel capacity is being wasted with the static allocation approach.

Thus, a need exists to provide dynamic transmission scheduling or dynamic allocation of messaging system resources.

DETAILED DESCRIPTION OF A PREFERRED EMBODIMENT

Figure 1:
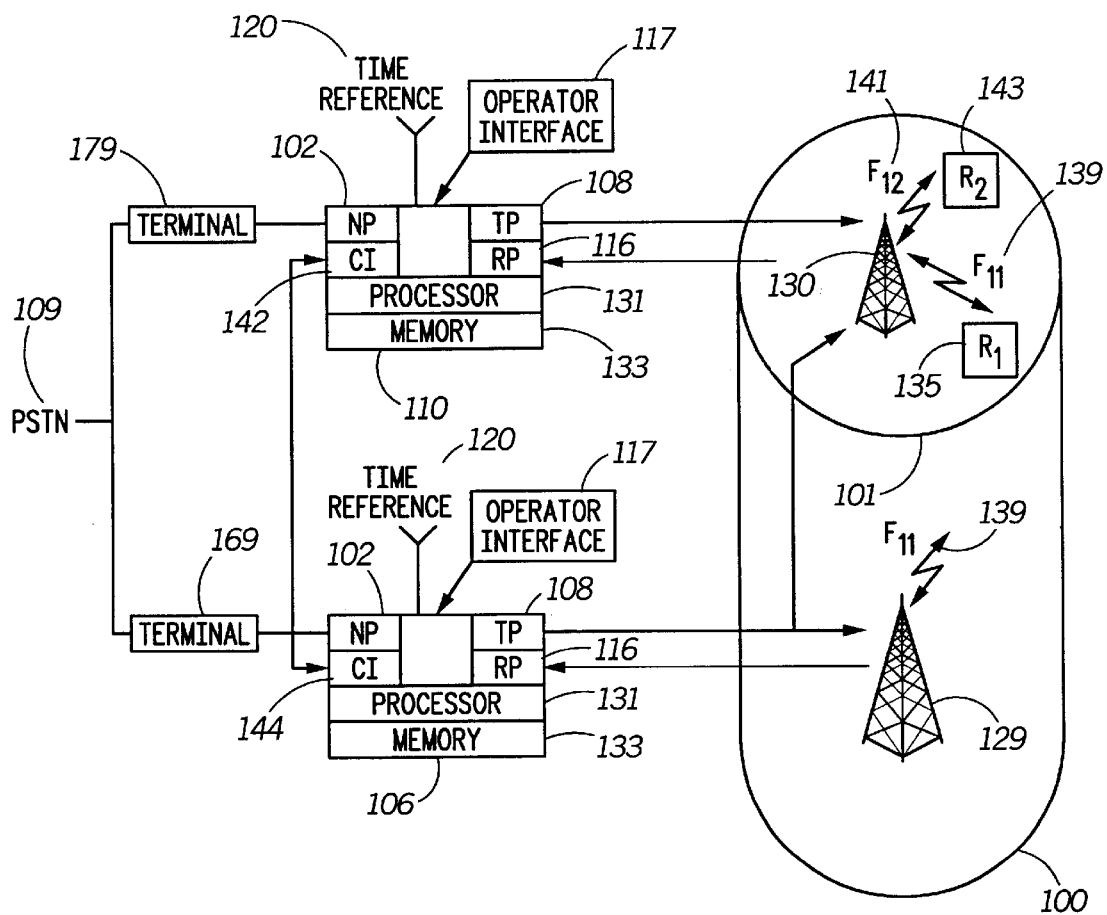
FIG. 1 is an illustrative diagram of multiple messaging systems in accordance with the present invention.

The present disclosure concerns messaging systems, and specifically messaging and paging subscriber systems that are arranged to reliably deliver, schedule, and transmit messages. More particularly, methods and apparatus for dynamically allocating a common resource, such as a radio frequency channel, between multiple systems is discussed. These systems include a messaging system controller or controller that is arranged to or responsible for scheduling messages or pages so as to provide service with minimal system latency.

A first method embodiment is set in a first controller and in a second controller that are arranged for providing messaging service to, respectively, a first and a second load. This method of dynamically allocating a resource between the first and the second load, includes the steps of: allocating a first and a second default portion of the resource to, respectively, the first controller and the second controller; scheduling messages from the first and second load utilizing, respectively, the first and the second default portion of the resource; determining an unused part of the first default portion of the resource at the first controller; reporting the unused part of the first default portion to the second controller; and scheduling messages from the second load utilizing the unused part, thereby dynamically allocating the resource between the first and the second load.

Preferably, the step of determining in the first method embodiment further includes determining an unused portion of the second default portion of the resource at the second controller. The first method also preferably further includes reporting the unused part of the second default portion to the first controller. The step of scheduling in the first method embodiment further includes scheduling messages from the first load utilizing the unused part of the second default portion, thereby dynamically allocating the resource between the second and the first load. The first method embodiment preferably further includes a step of reverting to the first and the second default portion for a resource allocation when either of the steps of reporting fails.

Alternative method embodiments are set in a similar environment and operate to dynamically allocate a resource between a first and a second load. These methods include the steps of: determining a first and a second capacity requirement for the first and the second load at, respectively, the first and the second controller; reporting the capacity requirement to the first controller; allocating, using an allocation algorithm, a first and a second portion of the resource to, respectively, the first and the second controller; and scheduling messages corresponding to the first load utilizing the first portion of the resource.

The step of reporting in a third alternative method embodiment preferably further includes reporting the first capacity requirement to the second controller. In one form, this method embodiment preferably implements the step of reporting the second capacity requirement responsive to a step of requesting at the first controller, the second capacity requirement. In another form of the method embodiment, the step of allocating preferably uses a common allocation algorithm or at least an algorithm that when executed at the first controller provides identical results as an algorithm executed at the second controller in so far as determining the second portion of the resource is concerned. In yet another form of the method embodiment, the step of allocating further includes allocating frames on channels for the first and the second controller. Preferably the step of scheduling in the method embodiment further includes scheduling messages corresponding to the second load utilizing the second portion of the resource.

A second alternative method embodiment of the present invention further includes a step of executing an allocation algorithm at the first controller rather than at both controllers. The second method embodiment of the present invention also preferably includes a step of forwarding the second portion as determined at the first controller to the second controller and scheduling messages corresponding to the second load utilizing the second portion of the resource.

An apparatus embodiment in accordance with the present invention is a first controller arranged to provide messaging service to a first load and to cooperate with a second controller arranged to provide messaging service to a second load so as to dynamically allocate a resource between the first and the second load. The first controller includes: a network port for receiving messages to provide the first load; a memory, coupled to the network port, for storing a first default portion of the resource and for storing the first load; a processor, coupled to the memory, for scheduling messages from the first load utilizing the first default portion and for determining an unused part of the first default portion; and a controller interface, coupled to the processor, for reporting information corresponding to the unused part of the first default portion to the second controller and for receiving information corresponding to an unused part of a second default portion of the resource; the processor then scheduling messages from the first load utilizing the unused part of the second default portion.

The apparatus embodiment preferably includes a user interface, coupled to the memory and the processor, for modifying the first default portion. The first controller preferably further includes a transmit port, coupled to the processor, for forwarding messages and scheduling information to one or more transmitters. Also, the first controller is preferably further arranged to operate in accordance with a time reference, for synchronizing time between the first controller and the second controller.

An alternative apparatus is a first controller that is arranged to provide messaging service to a first load and to cooperate with a second controller that is arranged to provide messaging service to a second load so as to dynamically allocate a resource between the first and the second load. The first controller includes: a network port for receiving messages to provide the first load; a memory, coupled to the network port, for storing the first load and an allocation algorithm; a controller interface for receiving a second capacity requirement corresponding to the second load; a processor, coupled to the memory and the controller interface, for determining a first capacity requirement corresponding to the first load, then executing the allocation algorithm to allocate a first portion of the resource to the first load, the first portion corresponding to the first and the second capacity requirement; and the processor then scheduling messages from the first load utilizing the first portion of the resource.

Preferably, the alternative apparatus embodiment uses the controller interface further to report the first capacity requirement to the second controller. The first controller executing the allocation algorithm, preferably, will allocate the first portion to be compatible with a second portion of the resource allocated at the second controller. The first controller also preferably implements the controller interface to receive the second capacity requirement responsive to a request generated by the processor. In one form, the first controller, specifically the processor, further allocates a second portion of the resource to the second load, the second portion corresponding to the first and the second capacity requirement and the controller interface, forwards or reports the second portion to the second controller, whereby the second portion is available to the second controller for scheduling messages corresponding to the second load. In another form, the first controller further includes a user interface, coupled to the memory and the processor, for modifying the first capacity requirement. The first controller also preferably further includes a transmit port, coupled to the processor for forwarding messages and scheduling information to a transmitter. The apparatus embodiments of the present invention in a messaging system controller arranged and constructed to implement the aforementioned methodology are further explained below.

Referring to FIG. 1, an illustrative diagram, in accordance with the present invention, of multiple messaging or paging systems with one or more common transmitters, utilizing a common resource, preferably operating on one or more common frequencies is depicted. FIG. 1 is a simplified diagram representative of many real world situations, wherein multiple systems provide geographically overlapping coverage or service to multiple and diverse, respective, subscriber populations using a common resource, such as one or more channels or radio frequencies. The inventive apparatus and methods used within the multiple messaging systems of FIG. 1 that provide for dynamic allocation of a common resource, such as a radio channel, between a first and second or multiple loads or messages corresponding to the respective subscriber population is the subject matter of this disclosure.

FIG. 1 depicts an area of service 100 or service area that overlaps a second area of service 101. The first controller 106, coupled to a terminal 169, via a network port (NP) 102, and thus the public switched telephone network (PSTN) 109, provides messaging service to the first service area 100 using transmitters 129, 130. Both transmitters are depicted operating on a frequency ($F_1$) during a first time period ($F_{11}$) 139 to deliver messages to a first subscriber population with a representative selective call receiver ($R_1$) 135 being depicted. A second controller 110, coupled to a terminal 179, via a network port 102, provides messaging service to the service area 101 using transmitter 130. Transmitter 130 is depicted operating on the same frequency ($F_1$) during a second time period ($F_{12}$) 141 to deliver messages to a second subscriber population with a representative selective call receiver ($R_2$) 143 being depicted.

The controllers 106, 110 are structurally and functionally similar. Controller 106 will be described and it is understood that controller 110 is analogous. Controller 106 includes a processor 131 programmed to handle the basic duties of the controller such as scheduling messages for subsequent delivery and when required executing allocation algorithms or otherwise facilitating cooperation between controllers 106, 110 thus resulting in the dynamic allocation of a message system resource as will be further discussed below. Further, the controller 106 comprises a memory 133, coupled to the processor 131, that is used for storage of operating programs, variables, messages or loads, algorithms, etc. as further described below.

An operator interface 117, preferably keyboard, monitor, etc., allows for human or automated modification of various operating condition parameters, such as, parameters related to various allocation algorithms as further discussed below. A time reference 120 allows the controller 106 to access a time reference from an external clock, such as that provided by a Global Positioning Satellite (GPS) receiver or other similarly accurate reference. The time reference facilitates the controller 106 in scheduling and compiling messages received from the terminal 169, as well as, preferably synchronizing communications with other controllers 110. A transmit port 108, within controller 106 is coupled to the processor and appropriate transmitters 129, 130 and operates, to forward messages to the transmitters 129, 130. The transmit port 108 of controller 110 is coupled to transmitter 130, and is utilized to forward messages to this transmitter 130. In general the transmit port of a controller is coupled to the transmitters which the controller needs to forward messages to. A receive port 116 accepts messages originating from two-way selective call receivers via an appropriately programmed base receiver not explicitly depicted yet often collocated with the transmitter 129, 130. The communication, further discussed below, between the first and second controllers 106, 110 is preferably implemented via a controller interface (CI) 144, 142, respectively, utilizing conventional wireless or wire-line communication techniques. The controllers 106, 110 can be collocated computers in the same locale. Alternatively the allocation algorithm can comprise collocated processes in the same computer.

The controllers 106, 110 are preferably a Motorola RF CONDUCTOR!™ (RFC!™) controller, or similar products available from other manufacturers suitably modified with the inventive principles disclosed herein. The controller 106, 110 are implemented with a single or dual SPARC™ processor with 128 MB of memory provided by SUN Microsystems of Mountain View, Calif. The terminal 169, 179, respectively, is coupled to, and often collocated with the controllers 106, 110. Such terminals are available from Motorola as the WMG™ paging terminal as well as similar products from other manufacturers.

Figure 2:
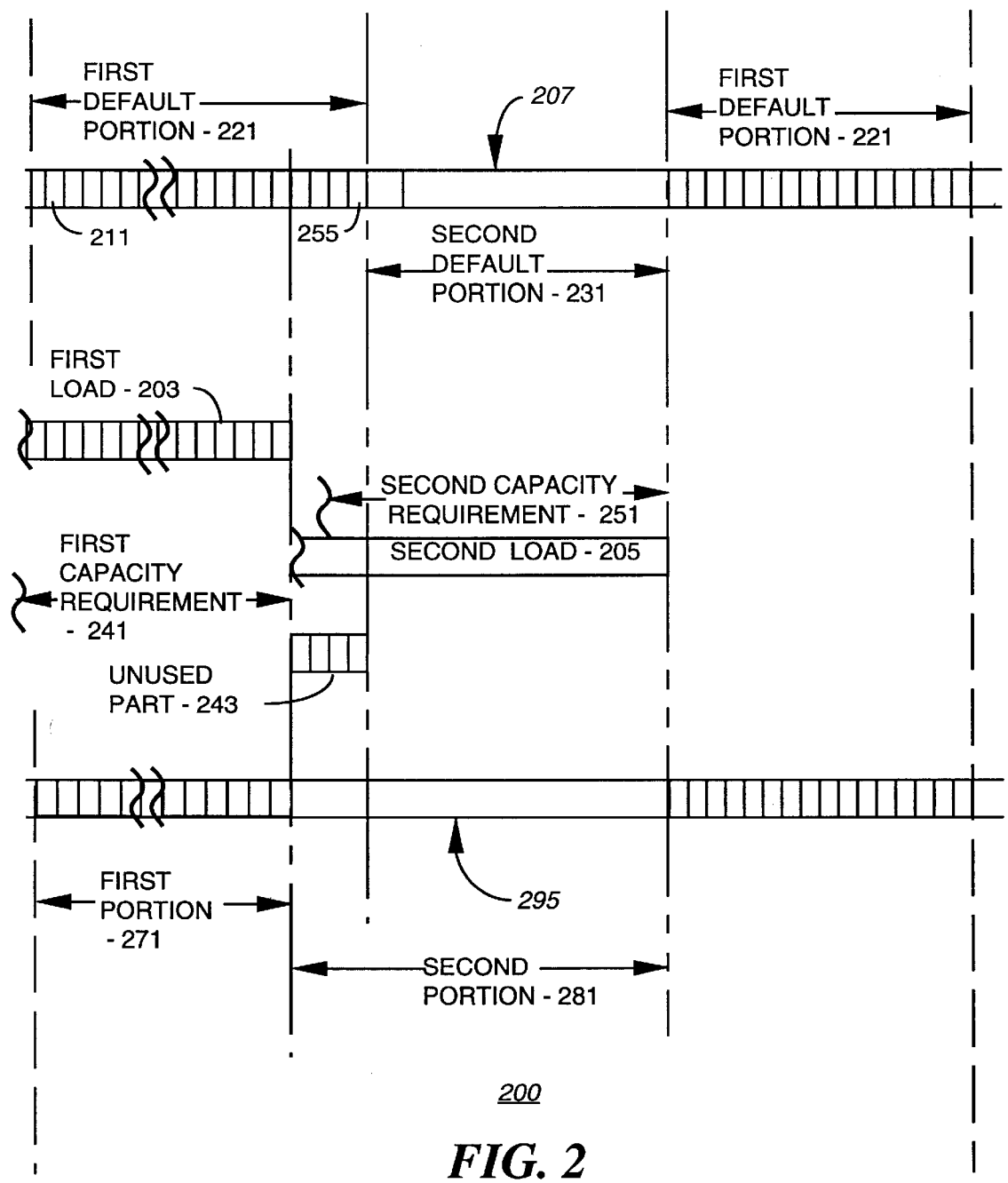
FIG. 2 is a resource allocation diagram.

The reader is referred to the FIG. 2 depiction of a resource allocation diagram depicting distinct loads, an initial default resource allocation, and resultant dynamically allocated resource, here time on a channel, in accordance with the present invention. This chart is representative of different messaging systems possibly using distinct communications protocols sharing a common communications resource or channel utilizing a dynamic time sharing or channel allocation scheme. FIG. 2 depicts, by example, the resource 207 partitioned in some predetermined or static fashion or allocation into a first default portion 221 and a second default portion 231. These default portions 221, 231 are allocated or assigned, normally using the operator interface 117, to the controllers 106, 110 and their loads 203, 205 respectively. Without more the first and second default portions 221, 231 are repeated indefinitely and the respective controllers schedule messages from their respective loads for transmission during their respective default portions.

It is understood that the default portion of time on the channel will be organized by the respective controller as required by the respective loads served. In one form, the first default portion 221 comprises frames such as frame 211 through 255 preferably representative of part of a FLEX™ protocol cycle. The second default portion 231 is representative of part of a cycle of POCSAG frames. Various motivations or factors may be used or considered in arriving at the static allocation. For example, the resource 207 can be partitioned based upon a first capacity requirement 241 and a second capacity requirement 251 which are reflective of or correspond to a first and a second load 203, 205. These capacity requirements are preferably related to the amount or expected amount of time on the channel required to deliver all the messages in the associated load. These capacity requirements may be weighted or be functions of time of day or otherwise chosen to reflect relative priorities between loads. A system operator can simply purchase a default allocation from another such operator.

In any event by way of example FIG. 2 depicts the default allocation or first and second default portions contrasted, respectively, with the first load 203 and the second load 205. The diagram depicts part of the first and second load 203, 205. In operation in one form the controllers 106, 110 determine their respective unused part or portion 243 relative to their respective default portions 221, 231 of the resource 207. The controller 106 then reports its respective unused portion 243, if any, to the controller 110, and, similarly, controller 110 reports any unused part of the default portion 231 to controller 106. Controller 110 is then at liberty to schedule messages, from the second load, within the unused part 243 or vice-a-versa. By communicating between the controllers 106, 110, the default portions 221, 231, are re-appropriated or re-allocated according to the actual resource required for their respective loads and thus the resource 207 is dynamically allocated.

In another form dynamic allocation of the resource 207 by the controllers 106, 110 produces the first portion 271 sufficient to schedule the first load 203 or more directly sufficient to handle its respective first capacity requirement 241 at least in view of the second capacity requirement 251 of the second load 205. Similarly, the second portion 281 is produced capable of handling the capacity requirement 251 of the second load 205. The result of this re-appropriation or reallocation of, for example, the unused portion 243 from one load to another, as generated by controller 106 in one form or both controllers 106, 110 in another form, is a dynamic allocation of resource 207 as depicted at 295. Where controller 106 does the allocation or is the arbiter it is anticipated that, based on information concerning the capacity requirements for each load, controller 106 will determine the portion of the resource to be allocated to each load or controller and information corresponding to the respective portions will be communicated to their respective controllers for subsequent utilization. Where both controllers do the allocation as is anticipated, that capacity information is exchanged and that at least one controller knows what allocation will be made by another. Preferably, if the dynamic allocation of the resource 207 fails for any reason such as a failure of the communications between them, the controllers 106, 110 revert back to their respective default portions 221, 231. By dynamically allocating the common resource 207, a more efficient and effective utilization of the resource 207 results as compared to a static or default allocation. Messages are therefore more efficiently compiled, queued, scheduled, and transmitted, hence users experience lower latency or delays when dynamic allocation of the resource 207 is used. The FIG. 2 depiction seeks to illustrate, by example, how a resource 207 such as a channel or other limited entity, may be shared by or dynamically allocated among multiple messaging systems using the same or multiple protocols.

Figure 3:
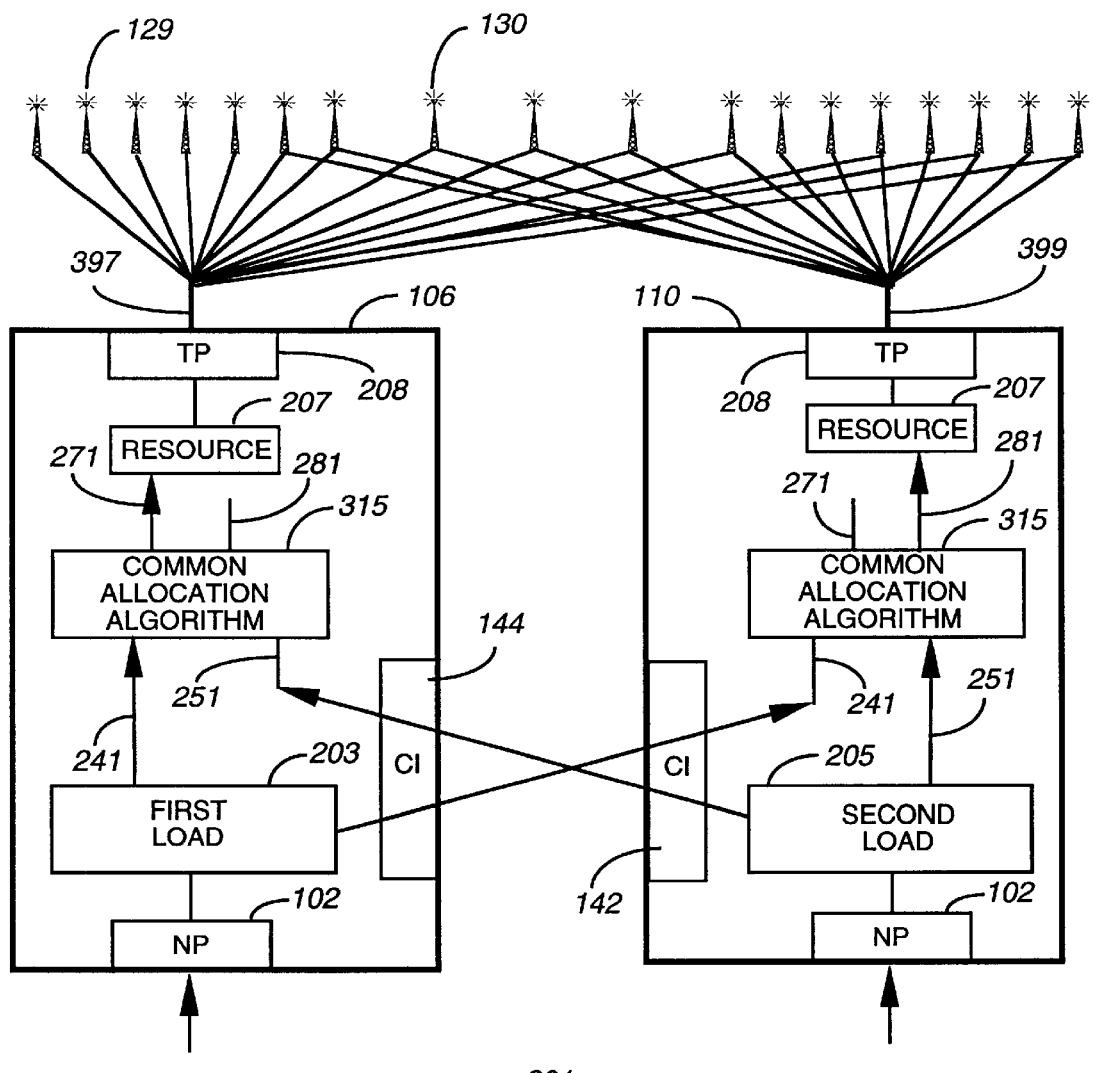
FIG. 3 is a block diagram of two selective messaging system controllers suitable for employing a first embodiment in accordance with the present invention.
Figure 4:
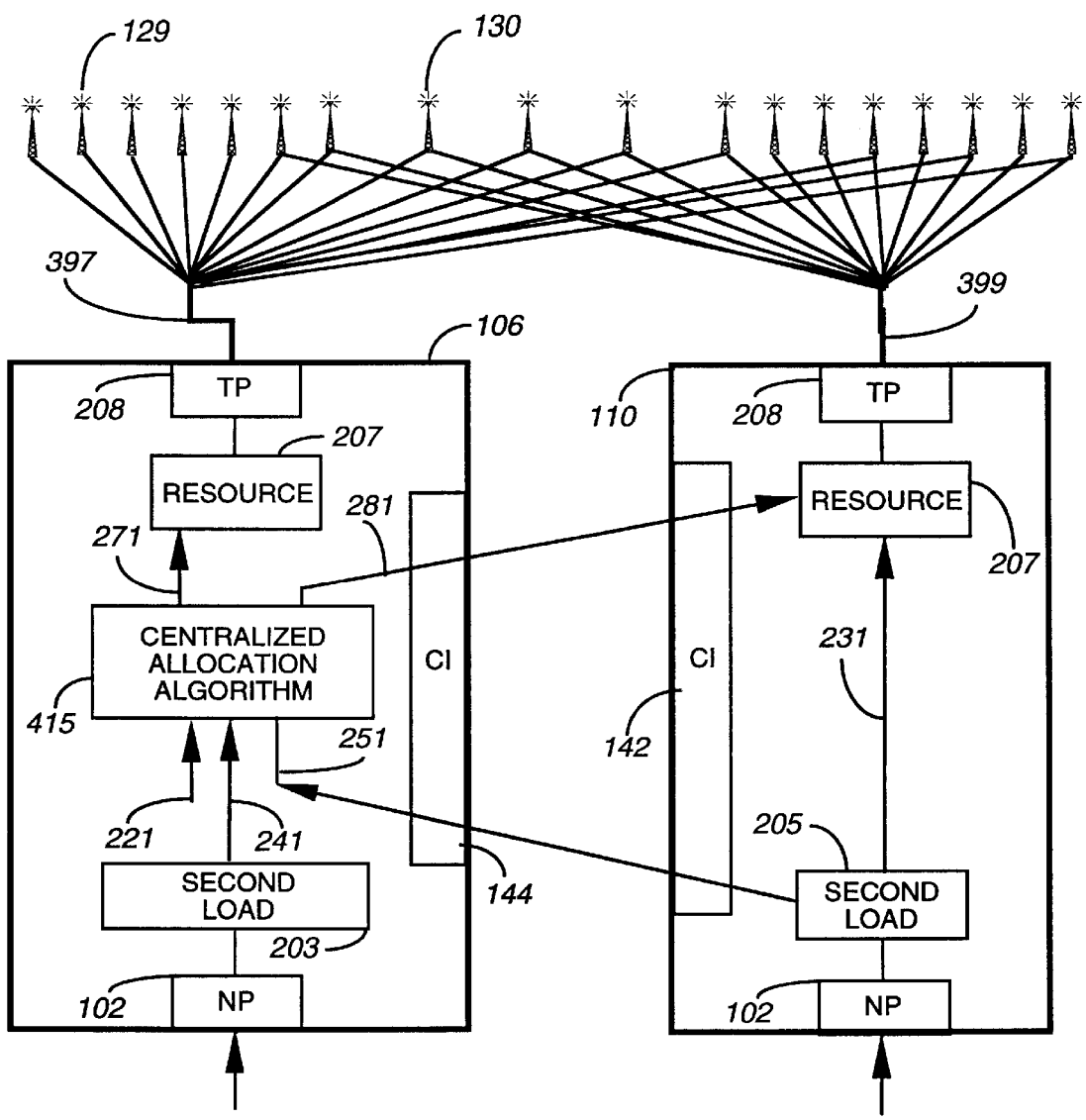
FIG. 4 is a block diagram of two selective messaging system controllers suitable for employing a second embodiment in accordance with the present invention.
Figure 5:
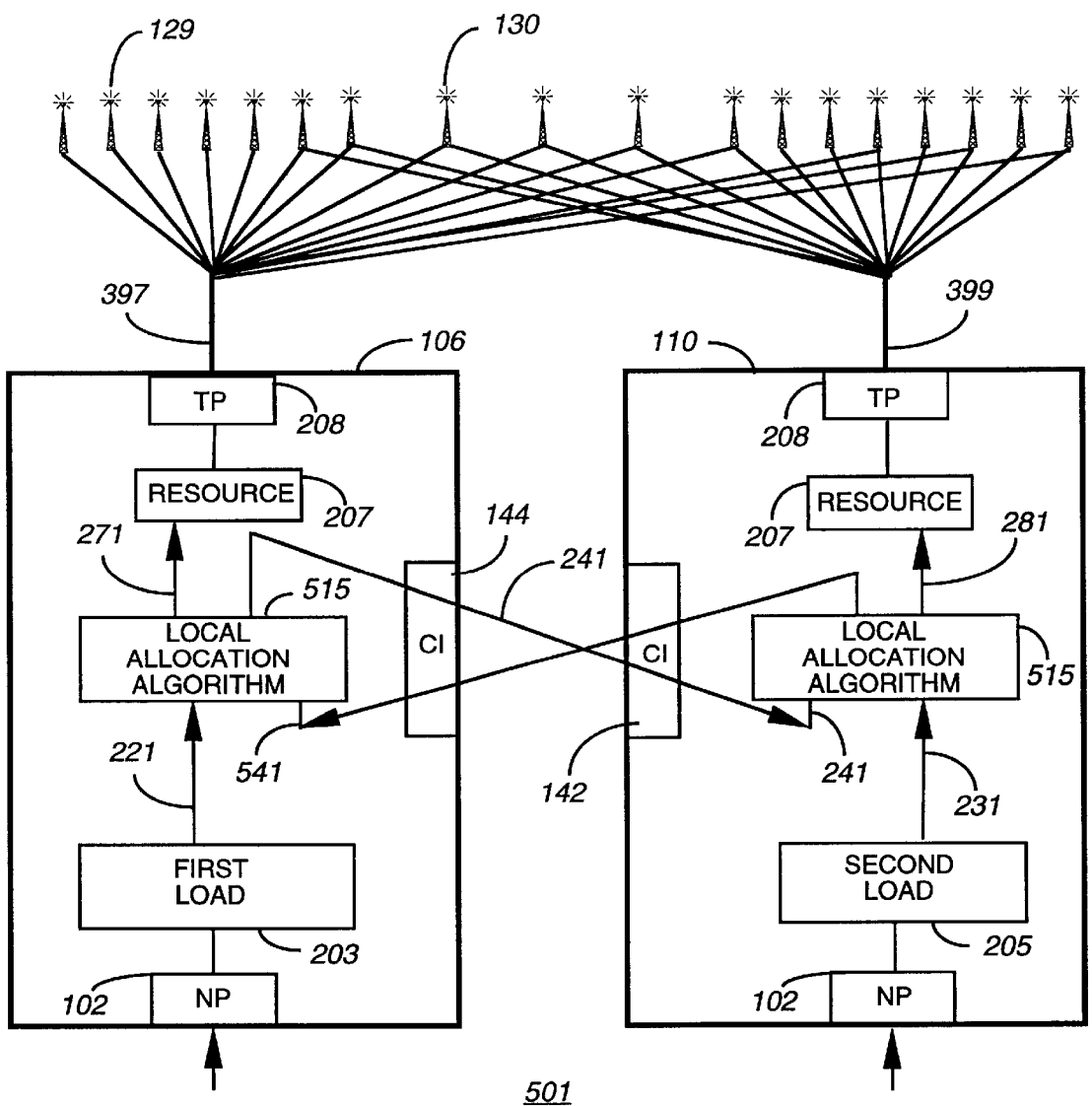
FIG. 5 is a block diagram of two selective messaging system controllers suitable for employing a third embodiment in accordance with the present invention.

Continuing in our present discussion, the reader is referred to the FIG. 3, FIG. 4, and FIG. 5 block diagram depiction of selective messaging system controllers suitable for employing embodiments in accordance with the present invention. These figures depict certain entities that are normally stored in the memory 133 of the respective controllers or that are, preferably, software routines that are executed by the processor 131 of the controllers or that are virtual renditions of the actual entity. For example the first load 203 and the second load 205 represent messages received through the network ports 102 and stored in the memory 133 of the respective controller 106, 110. The allocation algorithm 315, 415, and 515 are preferably software routines that are stored in the memory 133 and executed by the processor 131 of the respective controller 106, 110 within the respective embodiment. The resource 207 diagram is a virtual rendition of the actual resource, preferably capacity or time on the radio channel. FIGS. 3, 4, and 5 seek to further explain the operation of and in particular the information flows and processing that occurs within the preferred embodiment(s).

The FIG. 3 block diagram shows the first controller 106 and the second controller 110 preferably utilizing a common allocation algorithm 315 to dynamically allocate the resource 207 between the first load 203 and the second load 205. The common allocation algorithm 315 is common in the sense that the first controller 106, for example, knows under the particular circumstances, specifically the capacity requirements 241, 251 what portion of the resource will be allocated by the second controller 110 to the second load. Both the first controller 106 and the second controller 110 respectively receive inputs at the respective network port 102 from their terminals 169, 179. These respective inputs result in generating the messages comprising the first load 203 and the second load 205. The respective controller, specifically its processor 131, will determine the capacity requirement for their load. In this particular and other embodiments of the present invention, the first capacity requirement 241 and the second capacity requirement 251 are preferably exchanged or reported upon demand, or periodically, such as once-per-frame, in a synchronized manner between the first controller 106 and the second controller 110. The common allocation algorithm 315, when executed by the processor 131, utilizes the exchanged information or capacity requirement and its locally derived capacity requirement(s) to generate or allocate the first portion 271 and the second portion 281 of the resource 207 to the respective controller 106, 110. The result of this implementation are scheduled messages 397 from the first load, that are forwarded to the transmitters 129, etc. coupled to the first controller 106 and then transmitted or delivered during the first portion or time period of the resource. Similarly messages from the second load are forwarded to transmitter 130 for delivery during the second portion or time period of the resource. In the event that capacity requirement information is not available from another controller, due for example to a failure of the controller interface 144, 142 or pathway there between, the controllers 106, 110, revert to their respective default allocations 221, 231.

The implementation of dynamic allocation can be achieved by implementing a common allocation algorithm as described in the FIG. 3 discussion, or there can exist some form of "master/slave" relationship between the controllers 106, 110. For example, the controllers 106, 110 can begin with a static or default allocation of 50%-50%. This corresponds to the controller 106 having the first default portion 221 of 50%, and controller 110 has the second default portion 231 of 50%, or each controller has 50% of the channel capacity. As message processing proceeds, it is noted that the first default portion is not used or alternatively that the first capacity requirement 241 corresponding to the first load 203 is significantly less than the second capacity requirement 251. In the first case the unused part 243 of the default portion can preferably be offered to controller 110 for scheduling messages 399 from the second load 205. In the case where there is a period of increased messaging demand or an increase in the second capacity requirement 251, controller 110, will allocate or re-allocate the resource 207 or channel such that the second portion 281 is greater than 50. The allocation algorithm must, preferably, dynamically allocate the resource 207 or channel capacity to allow the first and second controllers 106, 110 an appropriate portion of channel capacity. This dynamically allocated portion can be based upon weighted or non-weighted capacity requirements 241, 251. Furthermore one controller 106 can spoof the other controller 110 concerning its capacity requirement 241 and thus prioritize its own load 203.

Next, the reader is referred to the FIG. 4 block diagram of two selective messaging system controllers suitable for employing a second embodiment. The second and first controller 110, 106 generates the second and first load 205, 203 from inputs or messages at their network ports 102 received from the respective terminals not explicitly depicted. The demands or capacity requirement 251 of the second load 205 is determined by the processor of the controller 110 and this second capacity requirement 251 is forwarded to the first controller 106. The first controller 106 executes a centralized allocation algorithm 415 which, responsive to the locally determined first capacity requirement 241 and the second capacity requirement 251, dynamically allocates the resource 207 between the first and second loads and controllers 106, 110. The second portion 281 or allocation for the second load is forwarded to the second controller 110. The processor 133 of the second controller 110 schedules messages from the second load in the second portion 281 of resource 207 and these messages are delivered as above. Similarly the processor 131 of the controller 106 schedules messages from the first load within the first portion 271. Again, in the FIG. 4 embodiment, if the communication port or controller interfaces 142, 144 should fail, the respective allocations revert to respective default portions 221, 231.

As we proceed in our discussion, the reader is referred to the FIG. 5 block diagram of two selective messaging system controllers suitable for employing a third embodiment of the present invention. Both the first controller 106 and the second controller 110 are assumed to have implemented a predetermined default allocation of the resource 207. The first default portion 221 is assigned to the first controller 106, and the second default portion 231 is assigned to the second controller 110. Similar to the FIG. 3 and FIG. 4 discussions, both the first controller 106 and the second controller 110 receive input from their respectively coupled terminals via the messages received at the NP 102. The input generates the first load 203 and the second load 205. Utilizing distinct of a local allocation algorithm 515, both the first controller 106 and the second controller 110 preferably assembles messages independently of one another based upon the first default portion 221 and the second default portion 231. During the process of assembling the messages, the local allocation algorithm 515 will determine by unused parts of the default allocations. The first controller 106 will relay the unused portion of the first default portion 221 to the second controller 110. Likewise, the second controller 110 will preferably relay any unused part of the second default portion 231 to the first controller 106. The local allocation algorithm 515 will utilize the first default portion 221 and any unused second default portion 231 to generate the first portion 271 of the resource 207. Similarly, the local allocation algorithm 515 will utilize the second default portion 231 and any unused first default portion 241 to generate the second portion 281 of the resource. The first controller 106 forwards scheduled messages 397 to its transmitter 129, as well as, the shared transmitter 130. Furthermore, the second controller 110 forwards scheduled messages 399 to its transmitter 130.

The aforementioned embodiments operate within the controller 106 which preferably includes the memory 133 comprising conventional Read-Only-Memory (ROM) and Random Access Memory (RAM). The RAM stores the load 203, 205. Dynamic allocation of the resource 207 can be implemented allowing the first and second controller 106, 110 to remain autonomous in their respective message compilation and queuing. The RAM is further used to store the capacity requirement 241 251 once determined. Most importantly, the RAM stores data critical to the implementation of the allocation algorithms 315, 415, 515 consistent with the suitable programming of the processor. The memory 133 also is also used to store an appropriate operating system kernel for managing the first and second controller 106, 110. Finally, the memory 133 includes other programs suitable for the support and maintenance of the software related to the teachings of the present invention.

Whether the resource is a channel, protocol, transmitter, or other common resource, FIG. 3, FIG. 4, and FIG. 5 is intended to depict by example that the resource 207 can be dynamically allocated and thereby more efficiently shared between multiple controllers or other entities in light of the embodiments of the present invention.

Figure 6:
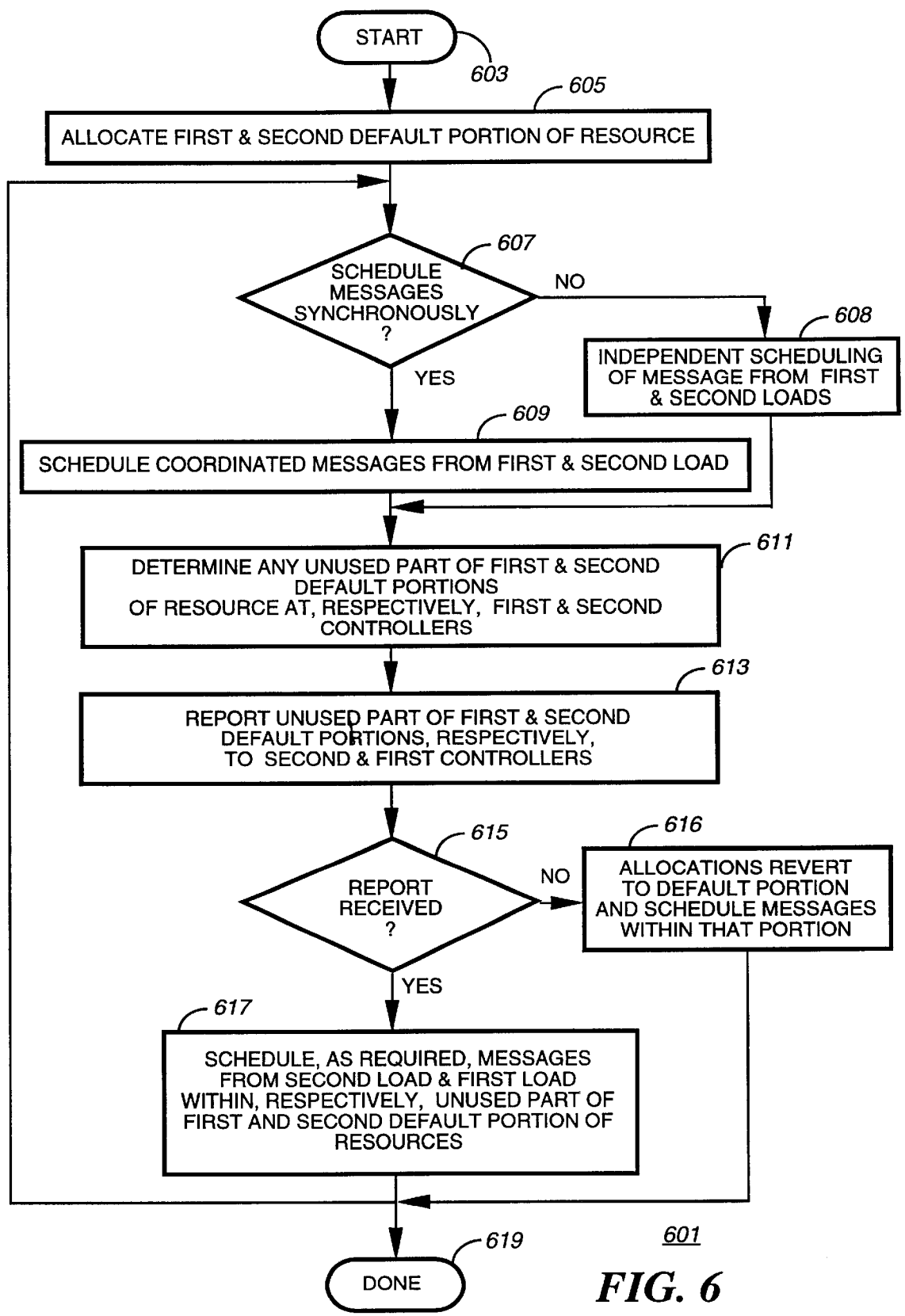
FIG. 6 is a flow chart of a first method embodiment in accordance with the present invention.

Referring to the FIG. 6 flow chart, a first method embodiment in accordance with the present invention, begins at step 603. Step 605 allocates the first and second default portion 221, 231 of the resource 207. This is, preferably, the respective allocation embodied into respective controllers by way of the operator interface 117. The method or process then inquires whether to schedule messages synchronously in step 607. A positive response to the step 607 inquiry results in scheduling coordinated messages from the first and second load 203, 205 in step 609. Conversely, a negative response to the step 607 inquiry sends the method to a step of independent scheduling of the first and second loads in step 608. In either case step 611 will determine any unused part of the first and second default portions 241, 541 of the resource 207 at, respectively, the first and second controllers 106, 110. In step 613, the method reports unused parts of the first and second default portions 241, 541, respectively, to the second and first controllers 110, 106. Step 615 tests whether the reports from step 613 were received. If not, step 616 indicates that all allocations revert to their respective default portions and subsequent messages are scheduled within these portions. If received, step 617 of the method schedules, as required, messages from the second load 205 and the first load 203 utilizing, respectively, any unused part 243 of the first and the second default portion 221, 231 of the resource 207 prior to the conclusion of the method in step 619.

Figure 7:
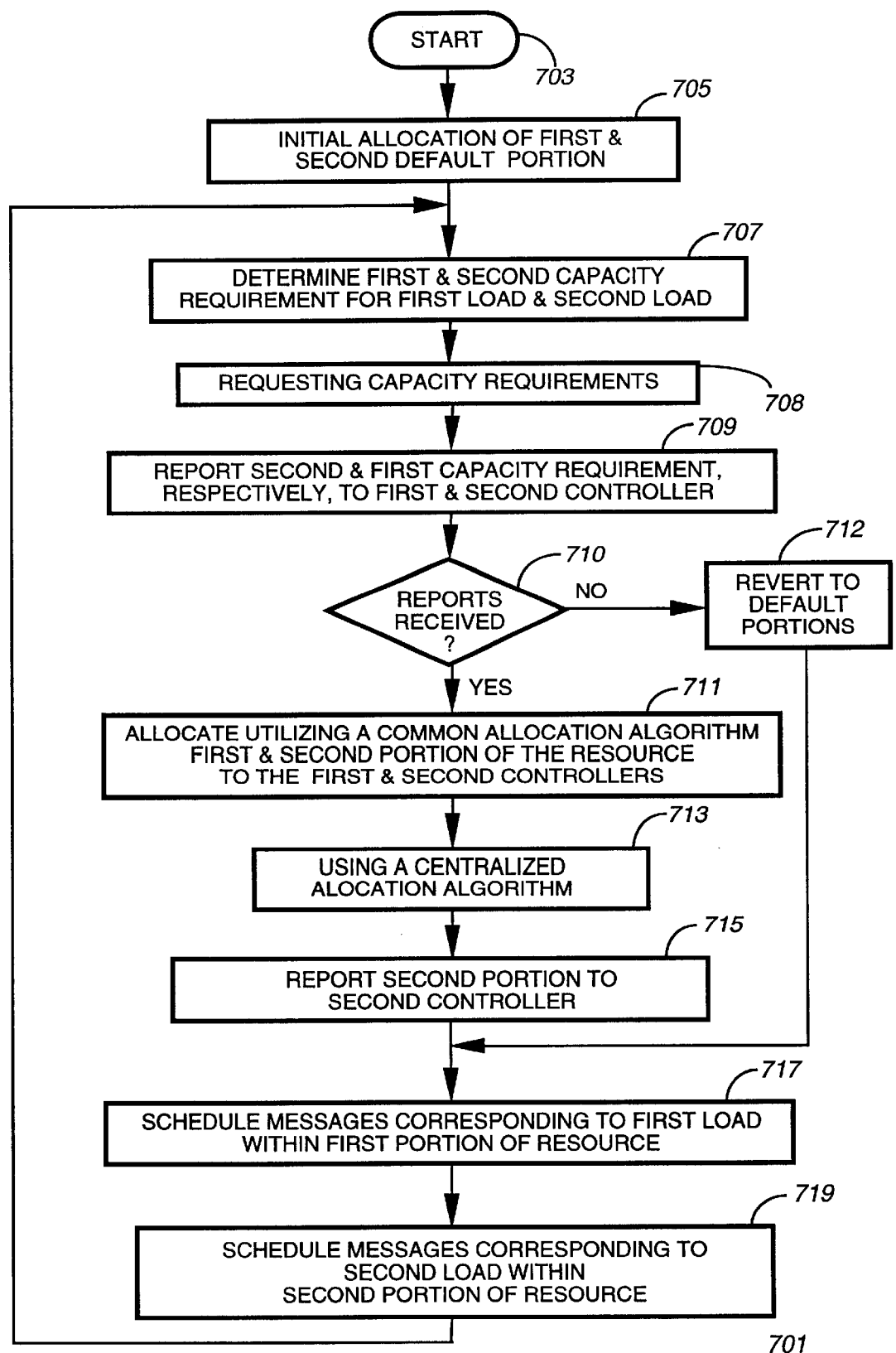
FIG. 7 is a flow chart of a second method embodiment in accordance with the present invention.

A second method embodiment is depicted in the FIG. 7 flow chart. The method or process begins in step 703 followed by an initial allocation of the first and second default portion 221, 231 of the resource 207 in step 705. Step 707 of the method determines a first and second capacity requirement 241, 251 for the first and second load 203, 205. At step 708 a request for the capacity requirement information is issued from one controller to another controller. Note: this step may be eliminated by periodically reporting the information. In step 709, the method reports the second and first capacity requirement 251, 241, respectively, to the first and second controller 106, 110. Step 710 determines whether the reports from step 709 were received. If not, step 712 causes all resource allocations to revert to their respective default portions. If so, the method continues to step 711 which allocates, utilizing a common allocation algorithm 315 at the first and second controllers 106, 110, a first and second portion 271, 281 of the resource 207. As an alternative to step 711, step 713 executes a centralized allocation algorithm at, for example, the first controller resulting in a first and second portion of the resource being allocated. Then step 715 reports the second portion to the second controller. Again and not depicted if the reports are not successfully sent or received both controllers revert to their respective default allocations. Following either steps 712, 711 or 715 the method continues at step 717 which schedules messages corresponding to the first load 203 utilizing or within the first portion 271 of the resource 207. Step 719 schedules messages corresponding to the second load 205 utilizing or within the second portion 281 of the resource 207 and then the method or process repeats from step 707.

Currently, time sharing between multiple controllers is constrained to maintain a symbiotic relationship while operating on a common frequency especially due to limited available spectrum and other system constraints. In some cases, these multiple messaging systems operate utilizing distinct communications protocols that have conflicting specifications. In other cases multiple messaging systems having a common communications protocol share a common channel with distinct delivery demands and non-congruent messaging system dynamics. In any case, multiple messaging systems have the ability to provide service as stand-alone entities each providing efficient wireless messaging when dynamic resource allocation as taught by this disclosure is implemented. As the demand for communications capabilities expand within the global marketplace, the need for controlling seamless messaging capability hinges on efficient inter-communications between multiple messaging system controllers regardless of their operating frequency or base communications protocols.

Thus, it should be clear from the preceding disclosure that the present invention provides a method and apparatus for dynamic resource allocation. The method and apparatus advantageously allows multiple messaging systems to more efficiently share their limited transmission resources.

Many modifications and variations of the present invention are possible in light of the above teachings. Thus, it is to be understood that, within the scope of the appended claims, the invention can be practiced other than as described herein above.

What is claimed is:

1. In a first controller and in a second controller arranged for providing messaging service to, respectively, a first and a second load associated with, respectively, a first and a second subscriber population, a method of dynamically allocating a common resource between said first and said second load, the method including the steps of:

accepting messages to provide said first and said second load at the first and the second controller respectively;

determining, at both said first and said second controller, a first and a second capacity requiremnet for said first and said second load at, respectively, said first and said second controller, where the first capacity requirement represents the expected amount of time required to deliver all messages representing the first load and where the second capacity requirement represents the expected amount of time required to deliver all messages representing the second load;

reporting, by the second controller, said second capacity requirement to said first controller and reporting, by the first controller, the first capacity requirement to the second controller;

allocating, at said first and said second controller respectively, using, at both said first and said second controller, both the first capacity requirement corresponding to said first load and the second capacity requirement corresponding to said second load, and using a common allocation algorithm at each of the first and second controller, a first and a second portion of said common resource to, respectively, said first and said second controller; and scheduling, respectively, at the first and second controller, messages corresponding to, respectively, said first and said second load to, respectively, the first and the second subscriber population utilizing, respectively, said first and said second portion of said common resource.

2. The method of claim 1 wherein said first and said second load represent, respectively, messages to said first and said second subscriber population.

3. The method of claim 1 wherein said step of reporting said second capacity requirement is responsive to a step of requesting, at said first controller, said second capacity requirement.

4. The method of claim 1 wherein said step of allocating further includes allocating frames on a channel for said first and said second controller.

5. The method of claim 1 further comprising the steps of:
defining a first and a second default portion of said resource for, respectively, said first controller and said second controller;
reverting to said first and said second default portion for a resource allocation when said step of reporting fails.

6. A first controller arranged to provide messaging service to a first load and to cooperate with a second controller arranged to provide messaging service to a second load so as to dynamically allocate a resource between said first and said second load, said first controller comprising in combination:
a network port for receiving messages to provide said first load where the first load represents a first volume of messages associated with a first subscriber population;
a memory, coupled to said network port, for storing a first default portion of said resource and for storing said first load;
a processor, coupled to said memory, for scheduling messages from said first load utilizing said first default portion and for determining a first capacity requirement for said first load at said first controller where the first capacity requirement represents the expected amount of time require to deliver all messages representing the first load; and
a controller interface, coupled to said processor, for reporting information corresponding to the first capacity requirement to the second controller and for receiving information corresponding to a second capacity requirement from the second controller where the second capacity requirement represents the expected amount of time required to deliver all messages representing the second load at the second controller;
said processor then allocating, at said first controller, using both the first capacity requirements corresponding to said first load and the second capacity requirements corresponding to said second load, and using an allocation algorithm, a first and a second portion of frames of said common resource to, respectively, said first and said second controller where the first portion allocated at the first controller is compatible with a second portion of the resource allocated at the second controller, and
said processor then scheduling messages to the first subscriber population utilizing said first portion of said common resource.

7. The first controller of claim 6 further including a user interface, coupled to said memory and said processor, for modifying said first default portion.

8. The first controller of claim 6 further including a transmit port, coupled to said processor, for forwarding messages and scheduling information to a transmitter.

9. The first controller of claim 6 further arranged to operate in accordance with a time reference, for synchronizing time between said first controller and said second controller.

10. In a first controller and in a second controller arranged for providing messaging service to, respectively, a first and a second load associated with, respectively, a first and a second subscriber population, a method of dynamically allocating a common resource between said first and said second load, the method including the steps of:
accepting messages to provide said first and said second loads at said first and said second controller respectively;
determining, at both said first and said second controller, a first and a second capacity requirement for said first and said second load at, respectively, said first and said second controller;
reporting, by the second controller, said second capacity requirement to said first controller;
allocating, at said first controller, using, at said first controller, both the first capacity requirements corresponding to said first load and the second capacity requirements corresponding to said second loads and using an allocation algorithm, said first and a second portion of said common resource to, respectively, said first and said second controller;
forwarding, by the first controller, information regarding said second portion of said common resource to said second controller; and
scheduling, respectively, at the first and second controller, messages corresponding to, respectively, said first and said second load to, respectively, the first and the second subscriber population utilizing, respectively, said first and said second portion of said common resource,
wherein said step of reporting said second capacity requirement is responsive to a step of requesting, at said first controller, said second capacity requirement.

11. The method of claim 10, wherein said step of allocating uses a central allocation algorithm executed at said first controller to determine said first and said second portion of said resource, and wherein said second controller does not use an allocation algorithm.

12. The method of claim 10, wherein said step of allocating further includes allocating frames on a channel for said first and said second controller.

13. The method of claim 12, wherein said first and second capacity requirements are the first and second amounts of time required to deliver the messages providing said first and second loads.

14. The method of claim 10, further including a steps of:
defining a first and a second default portion of said resource for, respectively, said first controller and said second controller;
reverting to said first and said second default portion for a resource allocation if the reporting step fails.

15. In a first controller and in a second controller arranged for providing messaging service to, respectively, a first and a second load associated with, respectively, a first and a second subscriber population, a method of dynamically allocating a common resource between said first and said second load, the method including the steps of:
accepting messages to provide said first and said second loads at said first and said second controller respectively;

determining, at both said first and said second controller, a first and a second capacity requirement for said first and said second load at, respectively, said first and said second controller;

reporting, by the second controller, said second capacity requirement to said first controller;

allocating, at said first controller, using, at said first controller, both the first capacity requirements corresponding to said first load and the second capacity requirements corresponding to said second loads and using an allocation algorithm, a first and a second portion of said common resource to, respectively, said first and said second controller;

forwarding, by the first controller, information regarding said second portion of said common resource to said second controller; and scheduling, respectively, at the first and second controller, messages corresponding to, respectively, said first and said second load to, respectively the first and the second subscriber population utilizing, respectively, said first and said second portion of said common resource, wherein said step of allocating uses a central allocation algorithm executed at said first controller to determine said first and said second portion of said resource, and wherein said second controller does not use an allocation algorithm.

16. The method of claim 15, wherein said step of reporting said second capacity requirement is responsive to a step of requesting, at said first controller, said second capacity requirement.

17. The method of claim 15, wherein said step of allocating further includes allocating frames on a channel for said first and said second controller.

18. The method of claim 15, wherein said first and second capacity requirements are the first and second amounts of time required to deliver the messages providing said first and second loads.

19. The method of claim 15, further including a steps of:

defining a first and a second default portion of said resource for, respectively, said first controller and said second controller;

reverting to said first and said second default portion for a resource allocation if the reporting step fails.

* * * * *